US006981221B2

(12) United States Patent
Neudeck

(10) Patent No.: US 6,981,221 B2
(45) Date of Patent: Dec. 27, 2005

(54) METHOD AND DATA NETWORK FOR AUTOMATICALLY CONFIGURING A PARAMETERIZING SURFACE OF MACHINE TOOLS OR PRODUCTION MACHINES

(75) Inventor: Michael Neudeck, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 98 days.

(21) Appl. No.: 10/713,968

(22) Filed: Nov. 14, 2003

(65) Prior Publication Data

US 2004/0098153 A1 May 20, 2004

(30) Foreign Application Priority Data

Nov. 19, 2002 (DE) ................................ 102 54 010

(51) Int. Cl.[7] ............................ G06F 3/00; G06F 9/00; G06F 17/00

(52) U.S. Cl. ...................... 715/735; 715/736; 715/737; 709/221; 709/222; 713/1; 713/100; 710/10; 710/16; 710/19; 700/17; 700/19; 700/83; 700/116; 700/170; 700/180

(58) Field of Search ................................ 700/9, 17, 19, 700/83, 96, 115, 116, 169, 170, 177, 179, 700/180; 702/188; 709/217–224; 715/733–737, 715/740; 703/1; 710/8, 10, 15, 16, 19; 713/1, 713/100; 717/171, 176

(56) References Cited

U.S. PATENT DOCUMENTS 5,737,319 A * 4/1998 Croslin et al. .............. 370/255
5,958,012 A * 9/1999 Battat et al. ................ 709/224
6,205,122 B1 * 3/2001 Sharon et al. .............. 370/254
6,225,999 B1 * 5/2001 Jain et al. ................... 715/734
6,349,352 B1 * 2/2002 Lea ............................. 710/72
6,735,548 B1 * 5/2004 Huang et al. ............... 702/179
2001/0034567 A1 * 10/2001 Allen et al.
2003/0064806 A1 * 4/2003 Gordon et al.
2003/0069960 A1 * 4/2003 Symons et al.
2004/0061701 A1 * 4/2004 Arquie et al.

FOREIGN PATENT DOCUMENTS

WO WO 147189 A1 * 6/2001 ........... H04L 12/24

* cited by examiner

*Primary Examiner*—Wilbert L. Starks, Jr.
*Assistant Examiner*—Crystal J Barnes
(74) *Attorney, Agent, or Firm*—Henry M. Feiereisen

(57) ABSTRACT

A method and a data network for automatically configuring a parameterizing surface of at least one controller of machine tools or production machines. An actual machine topology is determined via a data network when the machine starts up and compared with stored desired machine topologies. If the actual machine topology differs from the desired machine topology, a corresponding dedicated parameterizing surface is generated from the determined actual machine topology, whereby for parameterizing the controller of the machine only the parameters and/or functions of the identified machine components are indicated to the user. In this way, a dedicated parameterizing surface matching the actual machine configuration can be easily generated.

4 Claims, 2 Drawing Sheets

METHOD AND DATA NETWORK FOR AUTOMATICALLY CONFIGURING A PARAMETERIZING SURFACE OF MACHINE TOOLS OR PRODUCTION MACHINES

CROSS-REFERENCES TO RELATED APPLICATIONS

This application claims the priority of German Patent Application, Serial No. 102 54 010.1, filed Nov. 19, 2002, pursuant to 35 U.S.C. 119(a)–(d), the disclosure of which is incorporated herein by reference.

BACKGROUND OF THE INVENTION

The present invention relates to a method for automatically configuring a parameterizing surface of at least one controller and/or at least one controller of machine tools or production machines, as well as to a data network for connecting machine components in machine tools or production machines.

Manufacturers typically offer machine tools and/or production machines, including robots, in different versions, which can consist of a basic configuration and additional optional components and/or functions. These options are sometimes installed after the machine tool is delivered to a customer. The controller and/or regulator of the machine typically requires additional planning and startup work after the mechanical and electrical installation of the optional components is completed.

Production machines used for the manufacture of different products or production machines using different recipes may have other problems. Different machine components are frequently connected in different configurations and/or optional machine components can be added to a basic machine.

Until now, individual machine components have always been connected with each other in fixed configurations. The individual machine components, such as transducers or motors, input/output units as well as power controllers, were not connected with each other via data lines which would enable exchange of parameters that operate the various machine components. Accordingly, the controller or regulator of a machine was unable to automatically identify the connected machine configuration and/or the connected machine components. For this reason, the parameterizing surfaces for parameterizing the machine components, in particular the controller, have until now always been static, so that a suitable parameterizing surface for parameterizing the machine components had to be manually configured ahead of time for each customer-specific machine option or machine configuration.

It would therefore be desirable and advantageous to provide a method for automatically configuring a parameterizing surface for controlling machine tools or production machines, which obviates prior art shortcomings and can specifically be adapted to an actual machine topology.

SUMMARY OF THE INVENTION

The invention is directed to a method and a data network for automatically configuring a parameterizing surface a controller of machine tools or production machines.

According to one aspect of the invention, a method for automatically configuring a parameterizing surface for parameterizing a controller for a machine, in particular a machine tool or a production machine, includes the steps of automatically identifying at startup of the machine currently connected machine components via a data network which connects the machine components with each other; automatically identifying a structure of the data network to determine an actual machine topology; and comparing the actual machine topology with stored desired machine topologies. If the actual machine topology does not match one of the stored desired machine topologies, a parameterizing surface that is configured for the actual machine topology is generated from the determined actual machine topology, and only parameters and/or functions of the identified machine components are displayed to a user to be used for parameterizing the controller.

According to another aspect of the invention, a data network is disclosed for connecting machine components of a machine, in particular of a machine tool or a production machine. The machine components include uniform data interfaces connected to the data network for exchange of data between the machine components, wherein the data interfaces are implemented as physical point-to-point connections. The machine components include an intelligent component, for example, a component with a controller and a unique ID number.

According to another advantageous feature of the invention, after the structure of the data network has been automatically identified to determine an actual machine topology and the actual machine topology has been compared with stored desired machine topologies, the user has to confirm the identified actual machine topology before generating from the determined actual machine topology a parameterizing surface that is configured for the actual machine topology.

According to another advantageous feature of the invention, an ID number can be assigned to each currently connected machine component for automatically identifying the currently connected machine components. This guarantees a secure and unique identification of the connected machine component According to yet another advantageous feature of the invention, the ID number can include data of the corresponding machine component, in particular the serial number, order number, software version, machine version, manufacturer identification, manufacturer name and/or performance data. A comprehensive description of the machine component by way of the corresponding ID number allows a unique and reliable identification of the machine component.

According to yet another advantageous feature of the invention, the uniform data interfaces can be implemented physically as Ethernet interfaces, FireWire interfaces or USB interfaces. The aforedescribed data interfaces allow a particularly simple configuration of the data network.

According to yet another advantageous feature of the invention, the ID number can include a serial number, an order number, a software version, a machine version, a manufacturer identification, a manufacturer name and/or performance data. A comprehensive description of the machine component by way of the corresponding ID number allows a unique and reliable identification of the machine component.

According to another feature of the invention, the machine components can be implemented as at least one power controller, at least one motor, at least one sensor, at least one transducer, at least one input/output unit, at least one controller and/or at least one regulator. Power controllers, motors, sensors, transducers and input/output units represent conventional machine components.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
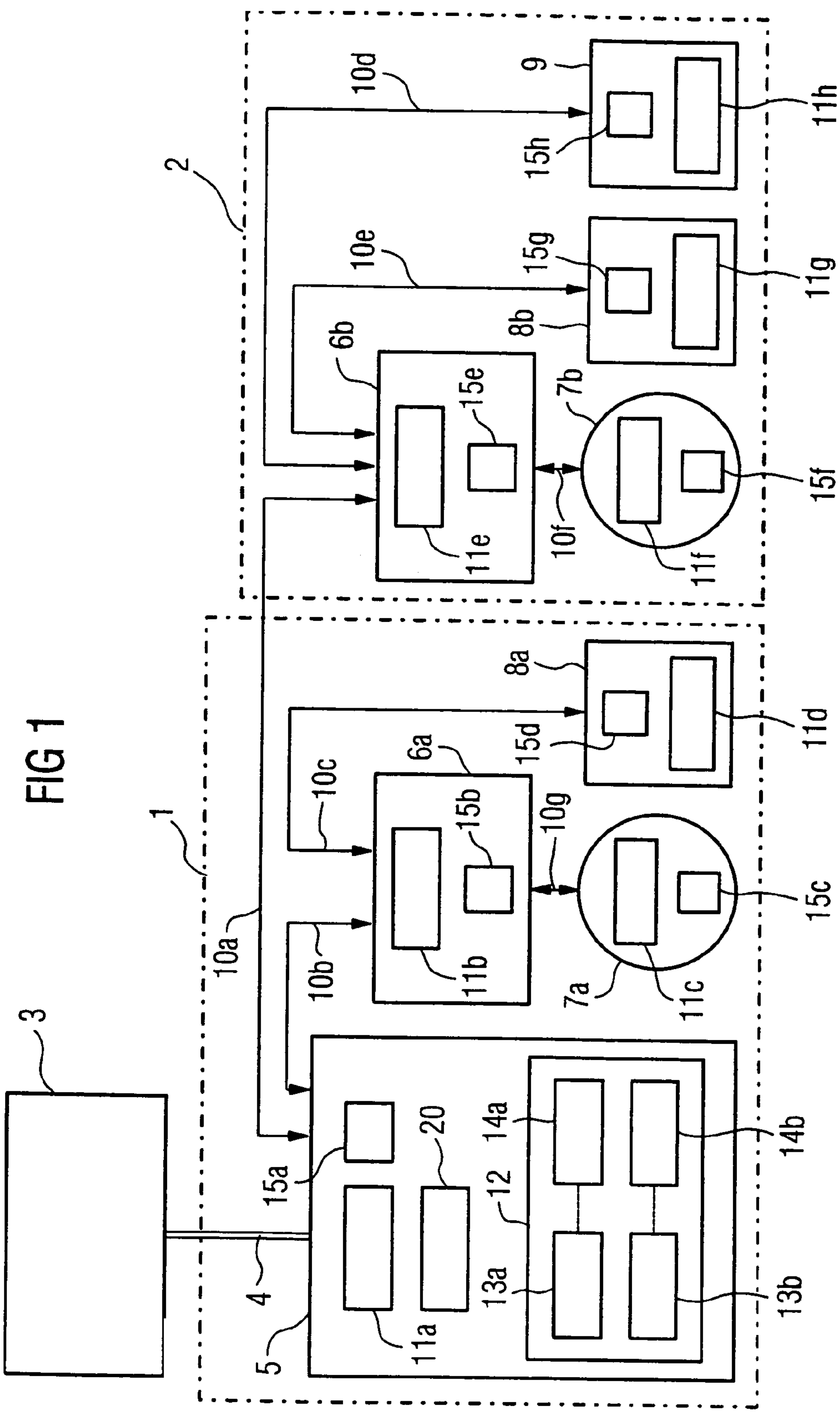
FIG. 1 is a schematic block diagram of a machine, including a data network.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic block diagram of a machine, which includes a basic machine 1 and an optional machine component 2. In the exemplary embodiment, only the machine in the form of the basic machine 1 is required when manufacturing a product A, whereas in addition to the basic machine 1 an optional machine component 2 has to be added when, for example, manufacturing a second product B. In the illustrated embodiments, the basic machine 1 includes the following machine components: controller 5, power controller 6*a*, motor 7*a* and transducer 8*a*. The optional machine component 2 in this example includes a power controller 6*b*, a motor 7*b*, a transducer 8*b* and an input/output unit 9. The individual machine components are connected with each other via a data network, which consists essentially of the physical point-to-point connections 10*a*, 10*b*, 10*c*, 10*d*, 10*e*, 10*f* and 10*g*. In the illustrated embodiments, the interfaces of the individual machine components are implemented as physical Ethernet interfaces. However, other physical interfaces, such as FireWire or USB (Universal Serial Bus) interfaces are also feasible.

Each of the machine components illustrated in the described examples has its own intelligence 15*a*, 15*b*, 15*c*, 15*d*, 15*e*, 15*f*, 15*g* and 15*h*, implemented for example in the form of a controller. In addition, each machine component has as a unique identification its own ID number 11*a*, 11*b*, 11*c*, 11*c*, 11*d*, 11*e*, 11*f*, 11*g* and 11*h*. A higher-level automation plane 3, which is not a part of the machine, is connected via a fieldbus 4 with the basic machine 1 and/or the controller 5.

The controller 5 includes a memory 12 which is preferably implemented as a nonvolatile memory 12. A first desired machine topology 13*a*, a second desired machine topology 13*b*, a first parameterizing surface database 14*a* and a second parameterizing surface database 14*b* are in the present embodiment stored in memory 12.

A parameterizing surface database is associated with each desired machine topology, as indicated in FIG. 1 by a dashed connecting line between, for example, the desired machine topology 13*a*, 13*b* and the parameterizing surface database 14*a*, 14*b*, respectively. Each parameterizing surface database includes the parameters for configuring the parameterizing surface for the respective desired machine topology. One exemplary parameter in such parameterizing surface database is, for example, an amplification factor of a drive control circuit.

In the embodiment depicted in FIG. 1, a first desired machine topology 13*a* and a first parameterizing surface database 14*a* are associated with the basic machine, if the machine consists of the basic machine 1 and the optional machine component 2. In other words, if the optional machine component 2 is connected, then the second machine topology 13*b* and a second parameterizing surface database 14*b* are also associated with the machine. The individual desired machine topologies and/or associated parameterizing surface databases are created by the manufacturer or by other trained personnel when the machine is started up using the method of the invention, and stored in memory 12.

It will be understood that instead of or in addition to the controller 5, a controller with a corresponding memory storing the corresponding desired machine topologies and/or parameterizing surface databases or several such controllers can exist in the machine. The machine can also have more than one additional optional machine component, as well as other types of machine components.

Figure 2:
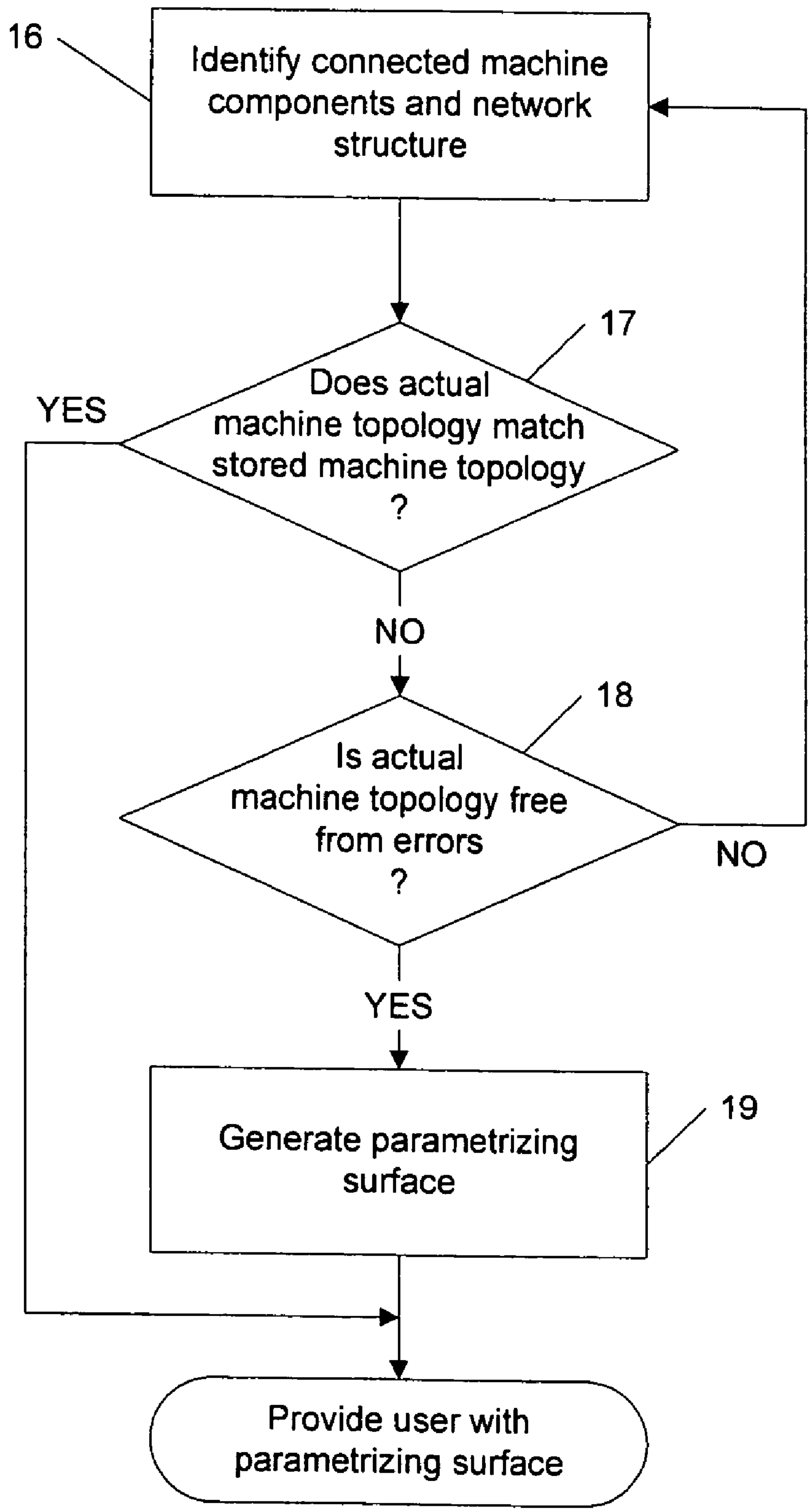
FIG. 2 is a flow diagram of a method according to the present invention.

FIG. 2 shows an exemplary flow diagram of the method according to the invention. When the controller 5 of the illustrated embodiment is initially automatically configured, the currently connected machine components are automatically identified inside the functional block 16 during the startup of the machine, and the structure of the data network is automatically identified. In other words, it is determined how the machine components are connected with each other in the data network, thereby identifying an actual machine topology 20 (see FIG. 1). The identified actual machine topology 20 includes information about the structure of the data network as well as identification of the connected machine components. The identification of the machine components can include data such as the serial number and/or order number and/or software version and/or machine version and/or manufacturer identification and/or manufacturer name and/or performance data. According to an advantageous embodiment, these data are combined in the form of an ID number, wherein the corresponding machine data can optionally be dynamically loaded via the data network from the controller, if not all data of the machine components required for the method of the invention are included in the ID number itself.

After the topology has been identified in decision block 16, decision block 17 compares the determined actual machine topology with the previously stored desired machine topologies. The corresponding desired machine topologies, as well as the associated parameterizing surface data, had either already been stored by the manufacturer or were established during an earlier startup of the machine using the method of the invention. If the comparison shows that an identical desired machine topology already exists for the actually identified actual machine topology, then the functional blocks 18 and 19 are bypassed and the user is provided with a parameterizing surface associated with the corresponding desired machine topology based on the data in the parameterizing surface database that are associated with the desired machine topology.

Assuming that the machine depicted in FIG. 1 is configured as a basic machine 1 without an optional machine component 2, and assuming that a first desired machine topology 13*a* and an associated first parameterizing surface database 13*b* already exist as a result of an earlier startup of the machine with the same configuration, then no new parameterizing surface is generated. Instead, a parameterizing surface is provided to the user based on or corresponding to the existing first parameterizing surface database 13*a*.

If decision block 17 determines that the identified actual machine topology does not match any stored desired machine topology, then the process goes to decision block 18.

In decision block 18, the automatically identified actual machine topology is checked for errors and accepted for the further processing, for example, after confirmation by the user. If the check in decision block 18 determines that the automatically identified actual machine topology has errors, then the process can be repeated after the machine is checked, for example, by returning to decision block 16, or particular parameters can be corrected manually. Decision block 18 hereby represents an optional feature in the context of an advantageous embodiment. The decision block 18 can optionally also be eliminated and the process can go directly from decision block 17 to decision block 19. Alternatively, the decision block 18 can be performed before the decision block 17.

The parameterizing surface is generated in functional block 19. Based on the determined actual machine topology, a specific parameterizing surface for that actual machine topology is generated, wherein only the parameters and functions of the identified machine component are displayed to the user for parameterizing the controller of the machine. For example, if a new drive consisting of a motor power controller and a rotation speed transducer is identified, then the associated software applications in the controller are activated and their parameter setting is generated, or optionally preset by the manufacturer. At the conclusion of the automatic configuration of the parameterizing surfaces; all parameters and functions required for the instantaneous machine configuration or the instantaneous actual machine topology are then available to the user. The actual machine configuration is stored as desired machine configuration with the associated parameter surface database in memory 12 after parameterization is concluded and the optionally preset parameters have been confirmed.

Assuming that the machine depicted in FIG. 1 is configured as a basic machine 1 that is connected to the optional machine component 2 and further assuming that no second desired machine topology 13*b* exists that corresponds to this actual machine configuration, then the method of the invention can generate a parameterizing surface that is tailored for the actual machine topology, and store the identified actual machine topology as second desired machine topology 13*b* together with the associated second parameterizing surface database 14*b* in memory 12.

It may happen in certain applications that particular machine components, such as a motor, do not have their own intelligence (controller) or do not have a connection to the data network. In such cases, an actual machine topology can typically still be determined by assuming that a manufacturer will always connect a particular motor type to a particular motor power controller, because the manufacturer always uses this motor type with the identified motor power controller. The method can therefore be carried out even if not all machine components are provided with their own intelligence or their own ID number and/or have a connection to the data network.

The actual machine topology, as well as additional data, such as the time of the activation of the actual machine topology, the time during which the actual machine topology was used, can be communicated to a higher-level automation plane 3 via a fieldbus 4. If the machine and/or the higher-level automation plane 3 is connected with a corresponding communication means (not shown in FIG. 1), for example a switched telephone network and/or the Internet/intranet, then the actual machine topology can be determined and monitored, for example, by the manufacturer of the machine.

It should be noted here that it may sometimes not be possible to use the original interface protocols with the above-mentioned physical data interfaces (Ethernet, FireWire or USB interfaces), because certain machines have stringent requirements for real-time data communication. The corresponding protocols for the physical interfaces may therefore have to be modified with certain applications to improve real-time commutation performance.

In addition, the ID number that identifies a machine component should describe such component as comprehensively as possible. The ID number can include, for example, the serial number of the component, an order number, a software version, a machine version and/or a manufacturer identification and/or the manufacturer's name.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A method for automatically configuring a parameterizing surface for parameterizing a controller for a machine, comprising the steps of:

a) automatically identifying at startup of the machine currently connected machine components via a data network which connects the machine components with each other, b) assigning an ID number to each currently connected machine component, wherein the ID number includes data of the corresponding machine component, said data selected from the group consisting of serial number, order number, software version, machine version, manufacturer identification, manufacturer name and performance data, c) automatically identifying a structure of the data network to determine an actual machine topology, d) comparing the actual machine topology with stored desired machine topologies, and e) if the actual machine topology does not match one of the stored desired machine topologies, generating from the determined actual machine topology a dedicated parameterizing surface that is configured for the actual machine topology, and f) for parameterizing the controller, displaying to a user only parameters and/or functions of the identified machine components.

2. The method of claim 1, wherein after performing step c) and d), requiring confirmation of the identified actual machine topology by the user before continuing with step e).

3. The method of claim 1, and further comprising the step of automatically pre-assigning values to the parameters of the identified machine components, wherein the pre-assigned values can be subsequently changed by the user through the parameterizing surface.

4. The method of claim 1, wherein the machine comprises a machine tool or a production machine.

* * * * *